United States Patent
Kellner

(10) Patent No.: US 11,753,077 B2
(45) Date of Patent: Sep. 12, 2023

(54) PARTIAL BODY FOR AN AT LEAST PART-ELECTRICALLY OPERATED MOTOR VEHICLE, AND MOTOR VEHICLE

(71) Applicant: Dr. Ing. h.c. F. Porsche Aktiengesellschaft, Stuttgart (DE)

(72) Inventor: Philipp Kellner, Rennigen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 224 days.

(21) Appl. No.: 17/092,532

(22) Filed: Nov. 9, 2020

(65) Prior Publication Data
US 2021/0171106 A1 Jun. 10, 2021

(30) Foreign Application Priority Data
Dec. 9, 2019 (DE) ...................... 10 2019 133 496.9

(51) Int. Cl.
| | | |
|---|---|---|
| *B62D 21/00* | (2006.01) | |
| *B62D 21/15* | (2006.01) | |
| *B60K 1/04* | (2019.01) | |
| *B60R 16/08* | (2006.01) | |
| *B62D 21/11* | (2006.01) | |

(52) U.S. Cl.
CPC ................ *B62D 21/15* (2013.01); *B60K 1/04* (2013.01); *B60R 16/08* (2013.01); *B62D 21/11* (2013.01)

(58) Field of Classification Search
CPC ........ B62D 21/15; B62D 21/11; B62D 25/20; B60K 1/04
See application file for complete search history.

(56) References Cited

U.S. PATENT DOCUMENTS

| | | | | |
|---|---|---|---|---|
| 8,251,169 B2* | 8/2012 | Fujiwara | ........... | H01M 10/6565 |
| | | | | 180/68.5 |
| 9,061,712 B2 | 6/2015 | Patberg et al. | | |
| 9,105,950 B2* | 8/2015 | Gadawski | ........... | H01M 10/613 |
| | | (Continued) | | |

FOREIGN PATENT DOCUMENTS

| | | |
|---|---|---|
| CN | 203974514 U | 12/2014 |
| CN | 107662651 A | 2/2018 |
| | (Continued) | |

OTHER PUBLICATIONS

English Translation of the Chinese Office Action for Chinese Application No. 202011231122.3, dated Sep. 5, 2022, 4 pages.

*Primary Examiner* — Hau V Phan
(74) *Attorney, Agent, or Firm* — RatnerPrestia

(57) ABSTRACT

A partial body for an at least part-electrically operated motor vehicle includes a first receiving portion for a traction battery and a second receiving portion for an electric drive unit. The receiving portions are arranged behind one another with respect to a vehicle longitudinal direction and are arranged at least partially at the same height with respect to a vehicle vertical direction. Here, a body transverse wall, which is of double-walled design at least in certain portions and which extends in the vehicle vertical direction and vehicle transverse direction, is arranged between the first and second receiving portion such that, in the event of an accident-induced displacement of the drive unit in the direction of the traction battery. The drive unit can be supported on the body transverse wall in a targeted manner.

21 Claims, 2 Drawing Sheets

(56) References Cited

U.S. PATENT DOCUMENTS

Figure 1:
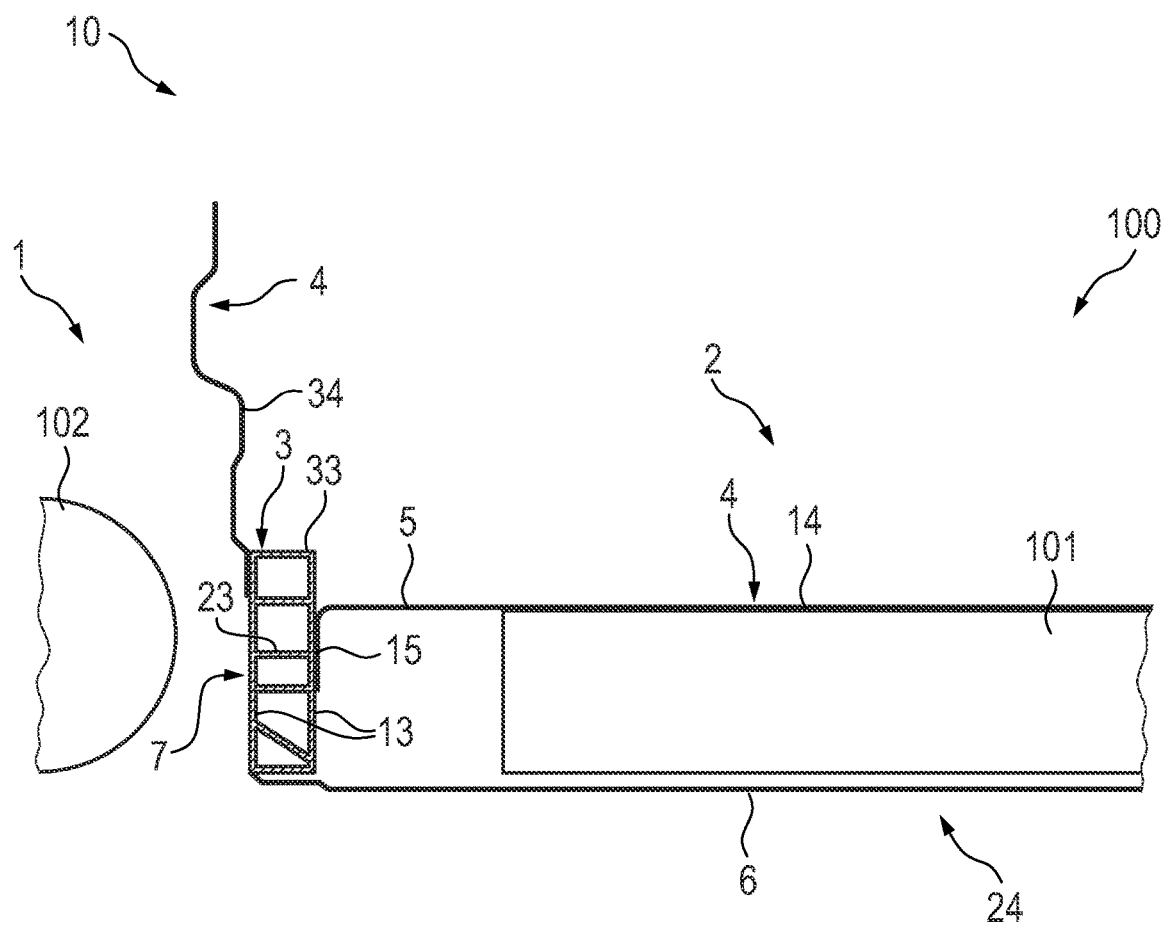

| | | | |
|---|---|---|---|
| 9,254,874 B2* | 2/2016 | De Luca | B62D 25/087 |
| 9,379,420 B2* | 6/2016 | Ketkar | F25B 49/025 |
| 9,505,441 B2 | 11/2016 | Merkel et al. | |
| 10,118,475 B2* | 11/2018 | Sugizaki | B60K 1/04 |
| 10,259,305 B2* | 4/2019 | Brausse | B62D 21/157 |
| 10,377,216 B2* | 8/2019 | Hitz | H01M 50/20 |
| 10,507,869 B2 | 12/2019 | Inoue | |
| 10,906,593 B2* | 2/2021 | Kellner | B62D 25/20 |
| 10,953,926 B2* | 3/2021 | Saunders | B60L 3/0007 |
| 2011/0300426 A1* | 12/2011 | Iwasa | B60L 50/72 |
| | | | 206/703 |
| 2016/0375750 A1* | 12/2016 | Hokazono | B62D 25/2036 |
| | | | 180/68.5 |
| 2017/0263957 A1* | 9/2017 | Minter | H01M 8/1007 |
| 2017/0365897 A1* | 12/2017 | Okada | H01M 10/625 |
| 2018/0337374 A1* | 11/2018 | Matecki | B60K 1/04 |
| 2019/0061505 A1* | 2/2019 | Cavus | H01M 10/6556 |
| 2019/0157643 A1 | 5/2019 | Glaser | |

FOREIGN PATENT DOCUMENTS

| | | |
|---|---|---|
| DE | 102011051698 A1 | 1/2013 |
| DE | 102012018464 A1 | 3/2013 |
| DE | 102015016492 A1 | 6/2017 |
| DE | 102018116879 A1 | 1/2019 |
| DE | 102017127064 A1 | 5/2019 |

\* cited by examiner

PARTIAL BODY FOR AN AT LEAST PART-ELECTRICALLY OPERATED MOTOR VEHICLE, AND MOTOR VEHICLE

CROSS-REFERENCE TO RELATED APPLICATION

This application claims priority to German Patent Application No. 10 2019 133 496.9, filed Dec. 9, 2019, the content of such application being incorporated by reference herein in its entirety.

FIELD OF THE INVENTION

The present invention relates to a partial body for an at least part-electrically operated motor vehicle having at least one first receiving portion for at least one traction battery and at least one second receiving portion for at least one electric drive unit. The receiving portions are arranged behind one another with respect to a vehicle longitudinal direction and are arranged at least partially at the same height with respect to a vehicle vertical direction.

BACKGROUND OF THE INVENTION

Protective measures are provided as a rule in such bodies in order to protect the traction battery from damage in the event of an accident-induced displacement of the drive unit. For example, the battery must not experience high degrees of deformation in a crash situation, since otherwise a battery fire can occur.

The battery is therefore regularly of correspondingly stable construction so that, for example in the event of a frontal crash, the front axle drive or, in the event of a rear crash, the rear axle drive does not damage the battery and the cells and modules contained therein. For this purpose, the battery is usually equipped with a housing which is often very heavy and elaborate.

DE 10 2018 116 879 A1, which is incorporated by reference herein, provides, as protective measure, an auxiliary frame, referred to as a suspension element, which is bolted to a right and left side element of the vehicle frame and surrounds the electric drive in a frame-like manner. This means that, in a crash situation, the collision load can be transferred from the drive to the auxiliary frame and the battery can be protected.

SUMMARY OF THE INVENTION

In view of the foregoing, it would be desirable to improve protection for the traction battery of at least part-electrically operated motor vehicles. The solution presented herein is intended to allow the protective measure to be implemented in a more lightweight and preferably also less elaborate manner.

The partial body according to aspects of the invention is provided for an at least part-electrically operated motor vehicle and in particular for an electric vehicle. In particular, the partial body comprises at least two receiving portions. The partial body comprises at least one first receiving portion for at least one traction battery and at least one second receiving portion for at least one electric drive unit. The receiving portions are arranged behind one another with respect to a vehicle longitudinal direction and are arranged at least partially at the same height with respect to a vehicle vertical direction. Here, at least one body transverse wall, which is of double-walled design at least in certain portions, is arranged between the first and the second receiving portion. Here, the body transverse wall extends in the vehicle vertical direction and vehicle transverse direction. This means that, in the event of an accident-induced displacement of the drive unit (mounted as intended) in the direction of the traction battery (mounted as intended), the drive unit can be supported on the body transverse wall in a targeted manner.

It is preferable that a lower edge of the body transverse wall is arranged at the same depth as or deeper than a lower edge of the traction battery mounted as intended in the first receiving portion and/or of the drive unit mounted as intended in the second receiving portion. This offers a particularly advantageous protective action. A "lower edge" is to be understood in particular as meaning the deepest point in an operational orientation of the partial body or of the motor vehicle.

At least in an envisioned accident-induced displacement direction of the drive unit, the body transverse wall is preferably supported on at least one body supporting structure in a form-fitting manner. It is preferable in all embodiments that the body transverse wall is supported in a form-fitting manner. In particular, the body transverse wall is supported on the body supporting structure in a form-fitting manner on a side facing away from the drive unit. As a result, the battery is particularly well protected and at the same time a particularly lightweight mode of construction can be implemented in an unelaborate manner. In particular, the partial body comprises at least one body supporting structure.

The body transverse wall is preferably connected to at least one body supporting structure by means of a plurality of joining points. Here, the body supporting structure is in particular the above-described body supporting structure. Here, a joining point particularly comprises integrally bonded joining and for example welding, adhesive bonding and/or soldering. The joining point can also comprise force-fitting and/or form-fitting joining. A "joining point" is to be understood in particular as also meaning areal joining. At least three and in particular at least six and particularly preferably at least ten or more joining points can be provided. 15 or 20 or 30 or more joining points are also possible.

The body supporting structure particularly comprises at least one floor panel and/or at least one rocker panel and/or at least one body tunnel and/or at least one longitudinal member and/or at least one crossmember and/or at least one body end wall. The connection to such body supporting structures offers particularly many advantages. The connection of the body transverse wall can also occur via at least one other component and in particular a planar component and/or carrier component of the body supporting structure.

In a particularly advantageous embodiment, the body transverse wall is connected to the body supporting structure at least in an upper portion and/or at least at the sides. Here, the sides refer in particular to a left and right side with respect to an intended direction of forward travel. In particular, the body transverse wall is connected, at least at the sides, to in each case at least one carrier component and for example a longitudinal member, rocker panel and/or crossmember or the like.

The upper portion relates in particular to an upper end of the body transverse wall. The upper portion relates in particular to an upper half or an upper quarter or else the upper 10% of the body transverse wall. It is also possible and advantageous for the body transverse wall to be connected to the body supporting structure at least in a lower portion.

The lower portion relates in particular to a lower end and for example a lower half or lower quarter or the lower 10% of the body transverse wall.

It is preferable that the body transverse wall comprises at least two walls which are arranged behind one another in the vehicle longitudinal direction. In particular, the walls are provided by in each case at least one panel. Steel panels and/or aluminum panels are possible, for example. The walls can also be provided by at least one profile element. In particular, the walls run parallel to a main plane of extent of the body wall. In particular, the walls are connected to one another. The body transverse wall can also comprise only one wall in certain portions.

In particular, the walls are oriented so as to be spaced apart from one another and/or parallel to one another. In particular, at least one inner wall and at least one outer wall are provided. In particular, at least one battery-side wall and at least one drive-side wall are provided. In particular, the walls extend in the vehicle vertical direction and vehicle transverse direction. In particular, the walls are arranged vertically with respect to an intended orientation of the partial body. In particular, two interconnected vertical walls are provided.

With particular preference, the body transverse wall comprises at least two and preferably a plurality of supporting walls. The supporting walls are in particular suited and designed to connect the walls to one another particularly with a stiffening action. In particular, the supporting walls run between the walls. In particular, the supporting walls run transversely with respect to the walls and/or transversely with respect to a main plane of extent of the body transverse wall. The supporting walls can run at right angles and/or obliquely or diagonally to the walls and for example at an angle of 45° to the walls. Within the scope of the present invention, a deviation of +/−5° or 10° or more can also be provided in the case of a right-angled arrangement. The above-described embodiments of the body transverse wall offer a high degree of safety and at the same time a lightweight constructional implementation.

In particular, the supporting walls are designed as walls. It is also possible for the above-described body transverse wall to be formed by a combination of at least one profile element with at least one wall made of sheet metal and/or at least one supporting wall made of sheet metal. However, within the scope of the present invention, a "supporting wall" is preferably also to be understood as meaning other types of supporting elements for the stiffening connection of the walls.

With particular preference, the walls are designed to be thicker than the supporting walls. In particular, the walls are designed to be thicker than at least one subset of the supporting walls. Such an embodiment has the advantage that local deformations of the drive-side wall do not "telephone through" and lead to a deformation of the traction battery, but are absorbed as deformations of the supporting walls.

In an advantageous development, there is provision, at least in certain portions, for an arrangement of the supporting walls which is formed by at least one supporting wall running at right angles to the walls and by at least two supporting walls, preferably arranged with respect to one another in a V shape, arranged adjacently to the wall and running at an acute angle to the wall. It is possible for this arrangement to be repeated within the body transverse wall. Here, at least additional supporting wall can be arranged between the repeating arrangements. Additional supporting walls can be arranged at right angles and/or at an acute angle, for example.

The body transverse wall particularly comprises at least one profile element and preferably at least two profile elements or is provided thereby. At least three or at least four or more profile elements can also be provided. The profile elements are preferably arranged above one another and/or behind one another. In particular, the profile elements are fixedly connected to one another. Such an implementation offers particularly many advantages. The side walls of the profile elements can be arranged so as to overlap at least in certain portions. It is possible for at least one profile element to be arranged upright and for at least one profile element to be arranged horizontal.

It is possible and preferable for the body transverse wall to comprise at least one profile element and at least one wall connected to the profile element. The profile element and the wall are preferably arranged above one another and/or behind one another. The profile element is in particular the above-described profile element. The wall is in particular the above-described wall. The wall is in particular designed as a panel or comprises at least one such panel. The profile element can also be connected to two or more walls. The wall can also be connected to at least two or more profile elements. The body transverse wall can take the form of a composite body which is formed from a plurality of fixedly connected profile elements and walls.

The profile element particularly takes the form of a strand profile and preferably of an extruded profile. The profile element can also take the form of a continuously cast profile or the like. The profile elements are in particular hollow profiles. In particular, the profile elements have supporting walls running in the interior. In particular, the profile element is manufactured from aluminum. The profile element can also be manufactured from steel or another suitable material. The longitudinal direction of the profile elements in the body transverse wall runs in particular parallel to a main plane of extent of the body transverse wall and/or in the vehicle transverse direction.

In an advantageous embodiment, the body transverse wall is connected, in particular fixedly, to at least one body floor element. Here, the body floor element particularly comprises at least one supporting portion on which the body transverse wall is supported in a form-fitting manner. In particular, the support is provided here in an envisioned displacement direction of the drive unit. In particular, the supporting portion is arranged transversely and in particular at right angles to the main plane of extent of the body floor element. The body floor element extends in particular in the vehicle longitudinal direction and vehicle transverse direction. The body floor element can comprise the above-described floor panel or be formed as such.

In a likewise advantageous embodiment, the body transverse wall is connected, in particular fixedly, to at least one body end wall. In particular, the body transverse wall bears against the body end wall in a form-fitting manner in the intended direction of displacement of the drive unit and/or in the direction of forward travel. The body end wall extends in particular in the vehicle vertical direction and vehicle transverse direction. In particular, the vehicle end wall extends substantially parallel to the body transverse wall.

It is possible and advantageous for the body transverse wall to be arranged at least in certain portions between the body floor element, in particular the floor panel, and the body end wall. In particular, the body transverse wall is supported here on the body floor element and the body end wall in a form-fitting manner.

The body transverse wall is preferably connected to at least one protective plate for protecting the traction battery from roadside attacks. This offers an advantageous and installation space-saving support for the body transverse wall. A releasable connection can be provided, for example for servicing work on the traction battery. In particular, the protective plate at least partially covers the first receiving portion toward the road. In particular, the protective plate is arranged outside the traction battery and in particular outside a battery housing of the traction battery. The protective plate can also be part of the traction battery. The protective plate particularly extends in the vehicle longitudinal direction and vehicle transverse direction.

The body transverse wall can comprise at least one passage opening for at least one electrical and/or hydraulic supply line for the traction battery and/or the drive unit. For example, the passage opening serves for guiding through a coolant line and/or a high-voltage line. By virtue of the arrangement between the receiving spaces, the body transverse wall is particularly advantageously suited as a passage for such lines.

The motor vehicle according to aspects of the invention can be operated at least part-electrically and is designed in particular as an electric vehicle. It is also possible for the motor vehicle to be designed as a hybrid vehicle. The motor vehicle comprises at least one partial body as has been described above. The motor vehicle comprises at least one traction battery received in or on the partial body. The motor vehicle comprises at least one drive unit received in or on the partial body.

Such a motor vehicle offers a particularly safe and at the same time weight-optimized accommodation of the traction battery, and this offers advantages for example with respect to range.

The drive unit particularly comprises at least one electric machine, preferably a motor and/or a generator. The drive unit particularly comprises at least one holding device for connecting the electric machine to the second receiving portion. The drive unit can also comprise axle components. The holding device can take the form of an auxiliary frame and/or of a subframe or comprise at least one such frame. It is possible for the battery and/or the drive unit to comprise at least one reinforcing structure which protects the battery from the ingress of the drive unit in the event of an accident.

The traction battery particularly takes the form of a high-voltage battery. The traction battery particularly comprises at least one battery module having a multiplicity of battery cells, and preferably a plurality of such battery modules. The traction battery can comprise at least one battery housing, also referred to as battery case, for housing battery modules. With particular preference, the traction battery takes the form of an underfloor battery. The traction battery can have a single-story or multistory module arrangement.

The second receiving portion can be arranged in the rear. The second receiving portion then serves to receive at least one drive unit for the rear axle. The body transverse wall then extends in particular between the rear axle and the first receiving portion. The second receiving portion can be arranged in the front end. The second receiving portion then serves to receive at least one drive unit for a front axle. The body transverse wall then extends in particular between the front axle and the first receiving portion.

The partial body can comprise at least two second receiving portions. In particular a second receiving portion is then arranged in the rear and at least one further second receiving portion is arranged in the front end. In particular, the partial body then comprises at least two body transverse walls. In particular, at least one body transverse wall is arranged in each case between the one second receiving portion and the first receiving portion and between the further second receiving portion and the first receiving portion. The partial body then comprises in particular at least two body transverse walls. In particular, at least one first body transverse wall separates the receiving portion in the rear from the first receiving region, and at least one second body transverse wall separates the receiving portion in the front end from the first receiving region. In particular, the partial body comprises in each case at least one body transverse wall for each drive unit and/or each traction battery.

The accident-induced displacement direction of the drive unit for the rear axle is in particular in the direction of forward travel. The accident-induced displacement direction of the drive unit for the front axle is in particular in the direction of rearward travel.

In particular, the first receiving portion is suitable and designed for receiving at least one traction battery taking the form of an underfloor battery. The first receiving portion is arranged in particular in the underfloor and/or comprises at least one body underfloor portion. In particular, the first receiving portion is arranged between a front axle and a rear axle. In particular, the first receiving portion is arranged between at least two second receiving portions.

The body transverse wall is in particular part of the vehicle body. The body transverse wall is preferably integrated into the partial body or vehicle body. The body transverse wall is connected, in particular fixedly and preferably nonreleasably without destruction, to a remaining structure of the partial body or vehicle body. In particular, the body transverse wall is suitable and designed to remain on the vehicle upon removal of the traction battery and/or drive unit. The body transverse wall is fastened to the remaining structure of the body in particular independently of the traction battery and/or the drive unit. The partial body can comprise further body components. In particular, all the components of the body transverse wall are connected to one another fixedly and preferably nonreleasably without destruction.

BRIEF DESCRIPTION OF THE DRAWING FIGURES

Further advantages and features of the present invention will become apparent from the exemplary embodiments which are explained below with reference to the appended figures.

Figure 2:
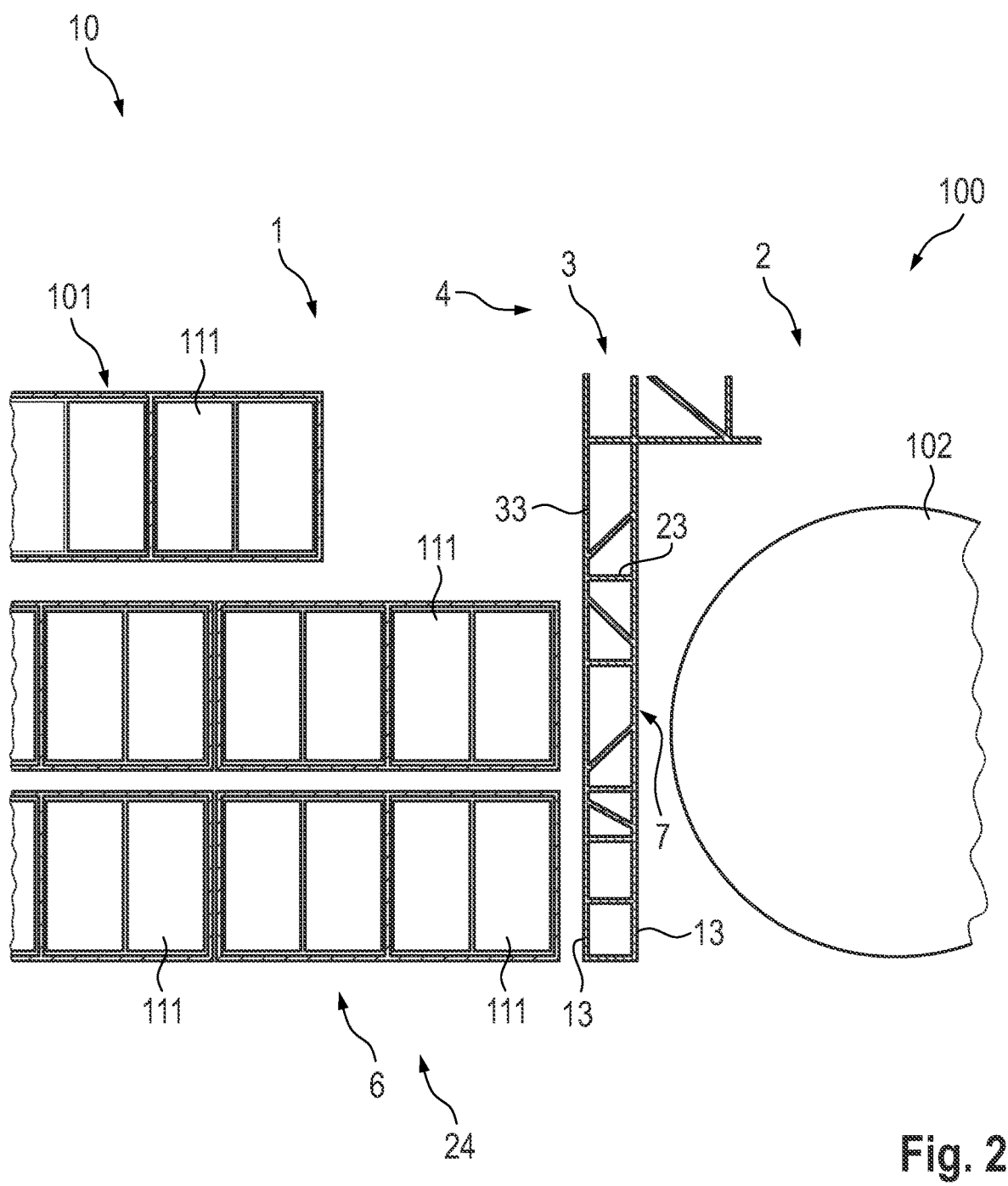

In the figures:

FIG. 1 shows a highly schematic illustration of a partial body according to aspects of the invention of a motor vehicle in a sectional side view; and FIG. 2 shows a highly schematic illustration of a further partial body according to aspects of the invention of a motor vehicle in a sectional side view.

DETAILED DESCRIPTION OF THE INVENTION

FIG. 1 shows a detail illustration of a motor vehicle 100 which is equipped with a partial body 10 according to aspects of the invention. The partial body 10 comprises a first receiving portion 1 for a traction battery 101 of the motor vehicle 100. The traction battery 101 here takes the form of an underfloor battery and serves to supply energy to an electric drive unit 102 for a front axle.

To receive the underfloor battery, the first receiving portion 1 is arranged in the underfloor region and is situated here below a body floor element 5 in the form of a floor panel 14. To receive the drive unit 102, the partial body 10 has a second receiving portion 2 in the front end.

The receiving portions 1, 2 are arranged here behind one another and at the same height. In the event of a frontal crash, a displacement of the drive unit 102 in the direction of the traction battery 101 can occur. In order to reliably protect the traction battery 101, the partial body 10 comprises a body transverse wall 3 which is arranged vertically here.

The body transverse wall 3 is here supported on a body supporting structure 4 in a form-fitting manner with respect to the accident-induced displacement direction of the drive unit 102. Serving as a body supporting structure 4 in the example shown here is a body floor element 5 in the form of a floor panel 14. The floor panel 14 here has an angled supporting portion 15 on which the body transverse wall 3 is supported.

Moreover, the body transverse wall 3 is fixedly connected here to a body end wall 34. Thus, the body transverse wall 3 is arranged here between the floor panel 14 and the body end wall 34 and supported on both of them.

The body transverse wall 3 can be fixedly connected to and in particular supported in a form-fitting manner on further body supporting structures 4 which are not illustrated here in further detail. Use can be made for example of a rocker panel 24, which is not illustrated here in any further detail, or else of a body tunnel or the like as body supporting structure 4. For example, two rocker panels 24 serve for the lateral connection of the body transverse wall 3.

On the body transverse wall 3 there is here mounted a protective plate 6 for protecting the traction battery 101 from roadside attacks. The protective plate 6 closes the first receiving portion 1 in the road direction. Additionally or alternatively to the protective plate 6, an underfloor cladding or the like can also be fastened to the body transverse wall 3.

The body transverse wall 3 is provided here by a profile element 33 which takes the form of an extruded profile and is made, for example, of aluminum. The profile element 33 is here a hollow profile having a plurality of supporting walls 23 running in the interior. The supporting walls 23 connect a battery-side wall 13 to a drive-side wall 13 of the body transverse wall 3. The supporting walls 23 run here at right angles and obliquely to the walls 13.

In addition to the profile element 33, the body transverse wall 3 can also comprise panels which are not illustrated in any further detail here, said panels forming further walls 13 or supporting walls 23. It is possible for example for there to be provided a composite body made up of the profile element 33 or further profile elements 33 and one or more panels.

Alternatively to the embodiment shown here, the body transverse wall 3 can also be produced from fixedly interconnected panels. The walls 13 and the supporting walls 23 are then in each case provided by corresponding panels. For example, aluminum panels or steel panels or the like can be provided for this purpose.

The partial body 10 can have a further second receiving portion 2 (not shown here) for a drive unit 102 of the rear axle. A further body transverse wall 3 as protective separation from the first receiving portion 1 is preferably then provided between the further second receiving portion 2.

FIG. 2 shows in the form of a detail a motor vehicle 100 equipped with a partial body 10 according to aspects of the invention. As in FIG. 1, there is here provided a traction battery 101 in the form of an underfloor battery for supplying energy to an electric drive unit 102. In this case, however, the drive unit 102 for the rear axle is shown here. In addition, in the region shown here, the traction battery 101 is multistory or equipped with a plurality of battery levels 111. The detail shown here can belong to the motor vehicle 100 described with respect to FIG. 1 or be part of another motor vehicle 100.

The second receiving portion 2 is arranged here behind the first receiving portion 1 in the direction of forward travel and serves for receiving the drive unit 102 of the rear axle. In order to protect the traction battery 100 from an accident-induced displacement of the drive unit 102 in the event of a rear impact, the partial body 10 comprises a body transverse wall 3 arranged between the receiving spaces 1, 2.

The way in which the body transverse wall 3 is connected or supported is not illustrated in further detail in the section plane shown here and occurs for example by way of suitable body supporting structures 4. For this purpose, there is for example provided a connection to the rocker panel 24 and preferably also a form-fitting support of the body transverse wall 3 in the upper region. To cover the first receiving portion 1, there can be provided a protective plate 6 which is not illustrated in further detail here.

The body transverse wall 3 here comprises two walls 13 which are arranged behind one another in the vehicle longitudinal direction. The walls 13 are connected via a plurality of supporting walls 23. In this case, there is here provided in certain portions an arrangement of the supporting walls 23 in which a supporting wall 23 running at right angles to the walls 13 is neighbored by two supporting walls 23 running at an acute angle thereto. Between these arrangements there are here provided further supporting walls 23.

The arrangement of the walls 13 and supporting walls 23 which is shown here allows particularly targeted support and at the same time offers particularly targeted deformation in the event of impingement by the drive unit 102. An advantageous deformation within the body transverse wall 3 is thereby achieved. It is additionally possible thereby to avoid undesired deformations of the drive-side wall 13 that could otherwise press through as far as the traction battery 101.

The body transverse wall 3 is provided here by a plurality of profile elements 33 arranged above one another. The profile elements 33 here take the form of aluminum extruded profiles and are fixedly connected to one another. In this case, the lower profile elements 33 are arranged here to be upright and the uppermost profile element 33 to be horizontal. The vertical walls 13 of the profile elements 33 are arranged here with a partial overlap.

Additionally or alternatively to the profile elements 33, the body transverse wall 3 can also comprise panels. For example, the panel can be used to connect the profile elements 33 which reinforce vertical walls 13 or else provide supporting walls 23.

In the figures illustrated here, the dimensioning of the supporting walls 23 and of the walls 13 is not illustrated true to scale. In particular, the walls 13 are configured to be thicker than the supporting walls 23 in order to achieve optimal support and targeted deformation.

The body transverse wall 3 can be equipped with one or more passage openings 7 not illustrated in further detail here, for example for cooling lines and/or high-voltage lines.

The invention presented here offers particularly robust compliance with the crash requirements for electric vehicles.

Here, the invention achieves particularly secure accommodation of the traction battery 101 and at the same time a considerable weight reduction and cost reduction for the protective measures. Particularly advantageous is the body transverse wall 3, which represents an integration of the protective measures into the body. It is thus possible for example to dispense with an often heavy battery case of elaborate construction or with other protective measures arranged outside the body.

| List of reference signs: | |
|---|---|
| 1 | Receiving portion |
| 2 | Receiving portion |
| 3 | Body transverse wall |
| 4 | Body supporting structure |
| 5 | Body floor element |
| 6 | Protective plate |
| 7 | Passage opening |
| 10 | Partial body |
| 13 | Wall |
| 14 | Floor panel |
| 15 | Supporting portion |
| 23 | Supporting wall |
| 24 | Rocker panel |
| 33 | Profile element |
| 34 | Body end wall |
| 100 | Motor vehicle |
| 101 | Traction battery |
| 102 | Drive unit |
| 111 | Battery level |

What is claimed:

1. A partial body for an at least part-electrically operated motor vehicle, said partial body comprising:
   at least one first receiving portion for at least one traction battery, the at least one traction battery including a battery housing and battery cells enclosed within the battery housing,
   at least one second receiving portion for at least one electric drive unit in the form of an electric motor,
   wherein the receiving portions are arranged behind one another with respect to a vehicle longitudinal direction and are arranged at least partially at the same height with respect to a vehicle vertical direction,
   wherein at least one body transverse wall, separate from the battery housing, which is of double-walled design at least in certain portions and which extends in the vehicle vertical direction and vehicle transverse direction, is arranged between the first and second receiving portion such that, in an event of an accident-induced displacement of the drive unit in the direction of the traction battery, the drive unit is supported on the body transverse wall in a targeted manner,
   wherein the at least one body transverse wall comprises at least two walls arranged behind one another in the vehicle longitudinal direction, and a plurality of supporting walls which connect the two walls to one another, and
   wherein each of the two walls is thicker than the supporting walls.

2. The partial body as claimed in claim 1, wherein a lower edge of the body transverse wall is arranged at a same depth as or deeper than a lower edge of the traction battery mounted as intended in the first receiving portion and/or of the drive unit mounted as intended in the second receiving portion.

3. The partial body as claimed in claim 1, wherein, at least in an envisioned displacement direction of the drive unit, the body transverse wall is supported on at least one body supporting structure in a form-fitting manner and/or wherein the body transverse wall is connected to at least one body supporting structure by a plurality of joining points.

4. The partial body as claimed in claim 3, wherein the body supporting structure comprises at least one floor panel and/or at least one rocker panel and/or at least one body tunnel.

5. The partial body as claimed in claim 3, wherein the body transverse wall is connected to the body supporting structure at least in an upper portion and/or at least at the sides.

6. The partial body as claimed in claim 1, wherein at least one of the supporting walls is arranged at right angles with respect to the two walls and at least two of the supporting walls are arranged adjacently to the wall and run at an acute angle to one of the two walls.

7. The partial body as claimed in claim 1, wherein the body transverse wall is provided by at least two profile elements arranged above one another, or wherein the body transverse wall comprises at least one profile element and at least one wall connected to the profile element, wherein the profile element and the wall are arranged above one another and/or behind one another.

8. The partial body as claimed in claim 1, wherein the body transverse wall is connected to at least one body floor element, and wherein the body floor element comprises at least one supporting portion on which the body transverse wall is supported in a form-fitting manner.

9. The partial body as claimed in claim 1, wherein the body transverse wall is connected to at least one body end wall and bears against the body end wall in a form-fitting manner in the direction of forward travel.

10. The partial body as claimed in claim 9, wherein the body transverse wall is arranged at least in certain portions between the body floor element and the body end wall.

11. The partial body as claimed in claim 1, wherein the body transverse wall is connected to at least one protective plate for protecting the traction battery from roadside attacks.

12. The partial body as claimed in claim 1, wherein the body transverse wall comprises at least one passage opening for accommodating at least one electrical supply line for the traction battery, at least one hydraulic supply line for the traction battery, and/or the drive unit.

13. A motor vehicle, which can be at least part-electrically operated, comprising the at least one partial body as claimed in claim 1, the at least one traction battery received on the partial body, and the at least one drive unit received on the partial body.

14. The partial body as claimed in claim 1, further comprising an empty space disposed between the double walls of the body transverse wall.

15. The partial body as claimed in claim 1, further comprising the at least one traction battery positioned within the at least one first receiving portion.

16. The partial body as claimed in claim 1, further comprising the at least one electric drive unit positioned within the at least one second receiving portion.

17. The partial body as claimed in claim 16, wherein the electric drive unit is assigned to an axle for powering wheels of that axle.

18. The partial body as claimed in claim 17, further comprising the at least one traction battery positioned within the at least one first receiving portion.

19. The partial body as claimed in claim 1, wherein no intervening features are positioned between the traction battery and the at least one body transverse wall, and no intervening features are positioned between the electric motor and the at least one body transverse wall.

20. The partial body as claimed in claim 1, wherein the electric motor is spaced apart from the at least one body transverse wall by a greater distance than the traction battery is spaced apart from the at least one body transverse wall.

21. The partial body as claimed in claim 1, wherein the traction battery and the electric motor are spaced equidistant from the at least one body transverse wall.

* * * * *